(12) United States Patent
Lord

(10) Patent No.: US 11,567,395 B2
(45) Date of Patent: Jan. 31, 2023

(54) FIELD PROTECTIVE OPTICS AND CAMERA LENS CASE

(71) Applicant: Andrew C. Lord, Cascade, CO (US)

(72) Inventor: Andrew C. Lord, Cascade, CO (US)

( * ) Notice: Subject to any disclaimer, the term of this patent is extended or adjusted under 35 U.S.C. 154(b) by 0 days.

(21) Appl. No.: 17/503,646

(22) Filed: Oct. 18, 2021

(65) Prior Publication Data

US 2022/0137490 A1   May 5, 2022

Related U.S. Application Data

(60) Provisional application No. 63/107,795, filed on Oct. 30, 2020.

(51) Int. Cl.
| | | |
|---|---|---|
| *G03B 17/56* | (2021.01) | |
| *F16M 13/00* | (2006.01) | |
| *H04N 5/225* | (2006.01) | |

(52) U.S. Cl.
CPC ......... *G03B 17/561* (2013.01); *F16M 13/005* (2013.01); *H04N 5/2252* (2013.01)

(58) Field of Classification Search
CPC .... G03B 17/56; G03B 17/561; G03B 17/566; F16M 13/005; F16M 13/06; A45C 11/38; H04N 5/2252
See application file for complete search history.

(56) References Cited

U.S. PATENT DOCUMENTS

| | | |
|---|---|---|
| 4,172,485 A | 10/1979 | Mathieu |
| 4,177,894 A | 12/1979 | Petersen |
| 5,850,706 A | 12/1998 | Evans |
| 2016/0229224 A1 | 8/2016 | Lester, III |

FOREIGN PATENT DOCUMENTS

KR   200302300 Y1 *  1/2003

* cited by examiner

*Primary Examiner* — Clayton E. LaBalle
*Assistant Examiner* — Fang-Chi Chang
(74) *Attorney, Agent, or Firm* — Harpman & Harpman

(57) ABSTRACT

A portable case adapted for the integral mounting of optical equipment having a split hinge tubular enclosure defining an equipment mounting interior cavity. An adjustable mounting rail system adjustably supports both the optical lens array and optical camera providing a self-contained pre-mounted enabled optical recording platform.

10 Claims, 6 Drawing Sheets

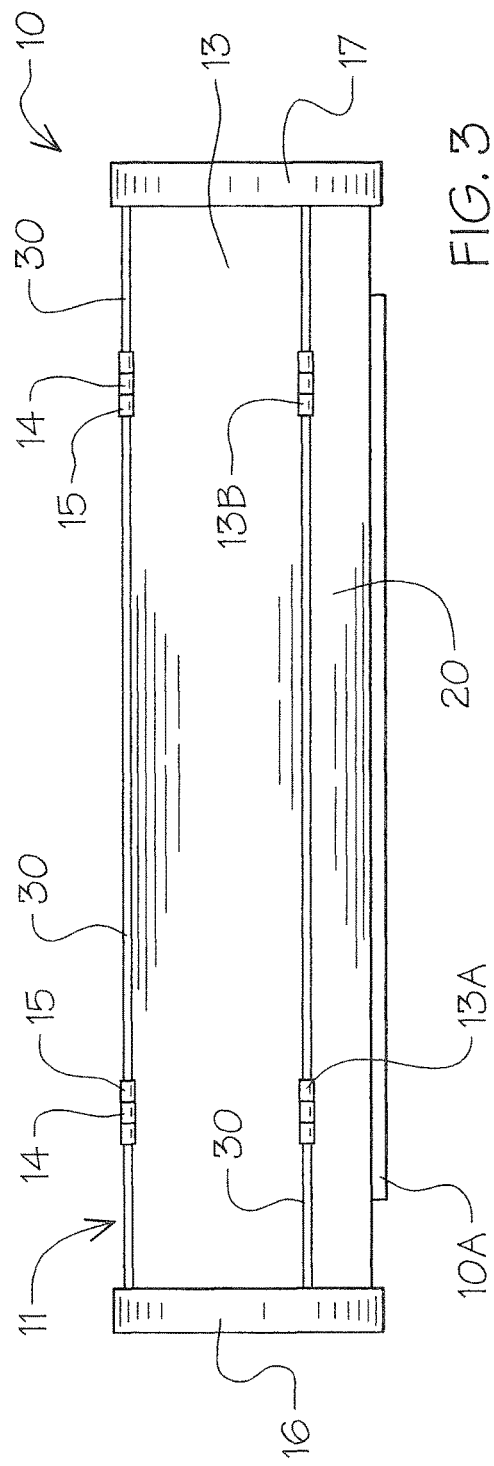
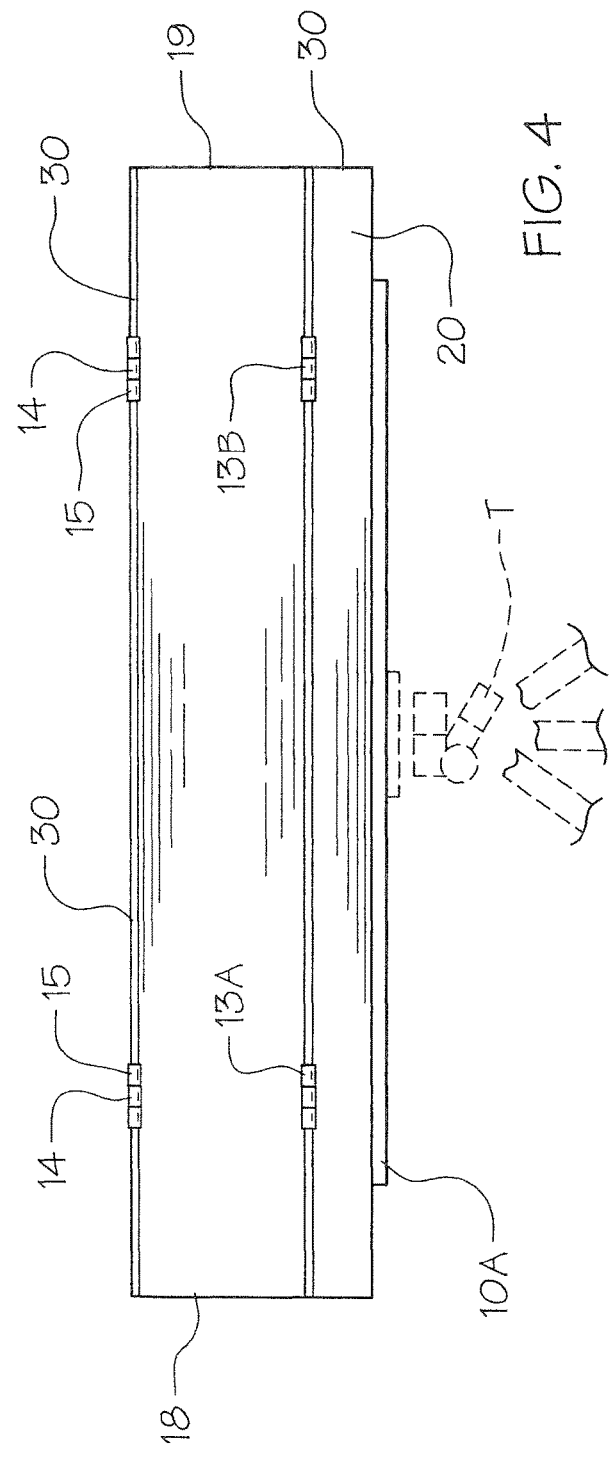

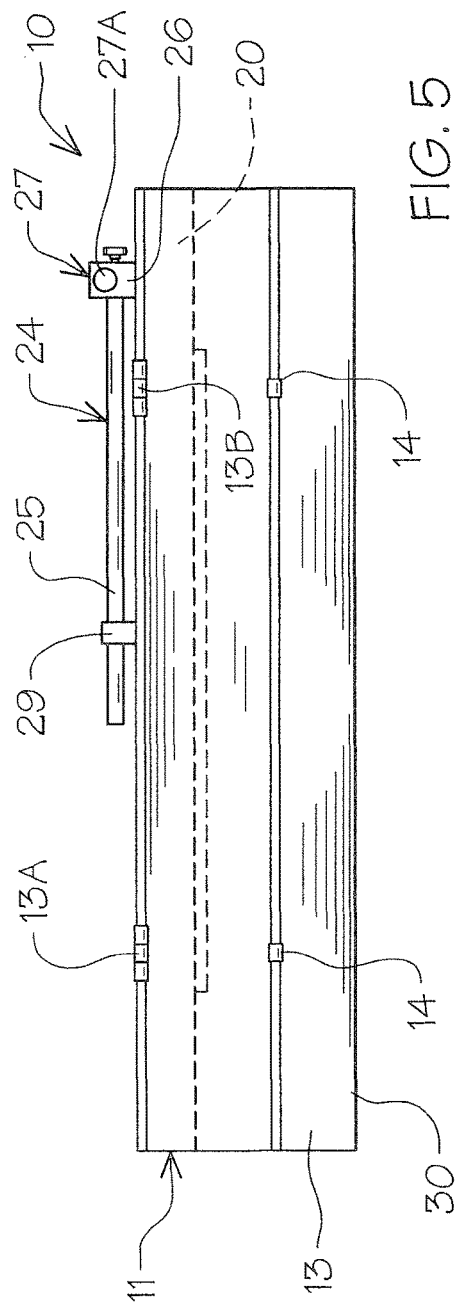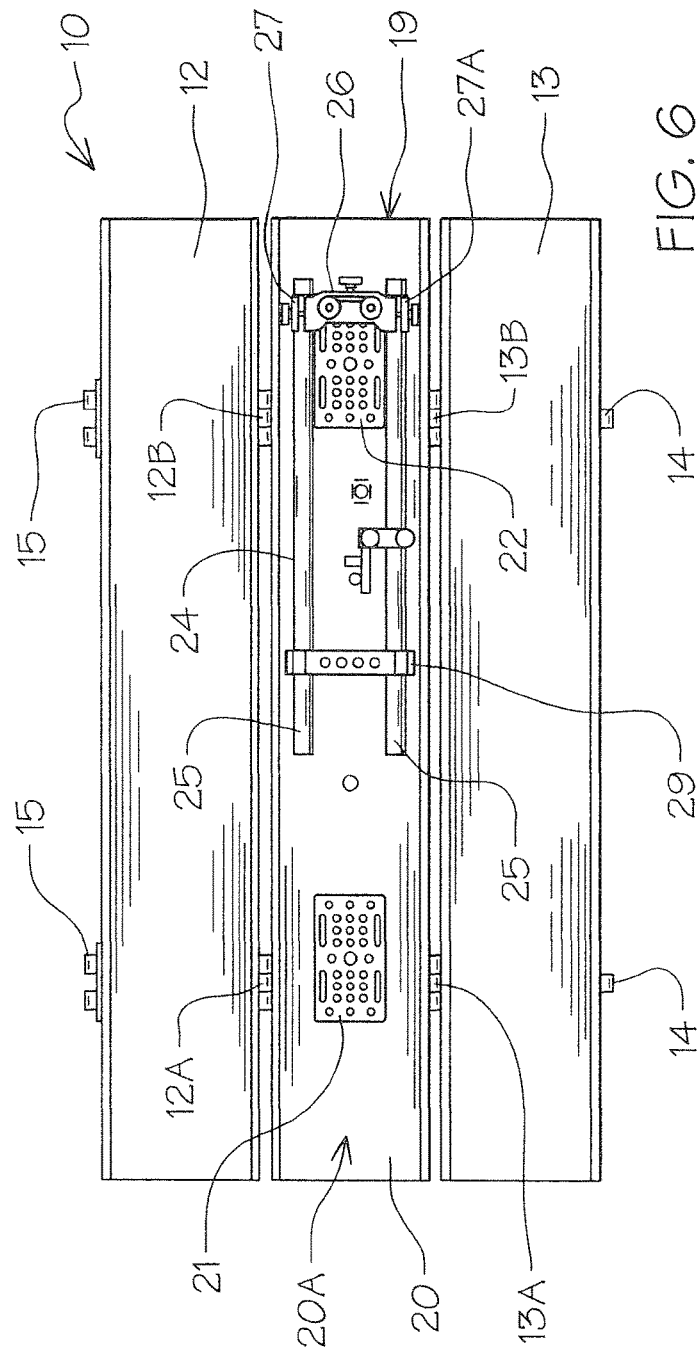

FIELD PROTECTIVE OPTICS AND CAMERA LENS CASE

This application claims the benefit of Provisional application 63/107,795, filed Oct. 30, 2020.

BACKGROUND OF THE INVENTION

1. Technical Field

This invention relates to self-contained transport cases used to store and safely transport equipment in the field. Such transport containers must be durable and able to hold and protect specialized and delicate equipment in a variety of environments.

2. Description of Prior Art

Prior art transport cases and holders have been developed for a variety of different equipment. Examples of such user specific transport cases can be seen in the following U.S. Pat. Nos. 4,172,485, 4,177,894, 5,850,706 and in related field U.S. Patent Publication 2016/0229224 A1.

In U.S. Pat. No. 4,172,485 discloses a lens case having a contoured and tubular lens extending shape to match the enclosed lens. The case allows the user to easily switch lens by joint lens and camera case interconnection construction.

U.S. Pat. No. 4,177,894 is directed to optical lens transport and storage case that provides a tubular body with a fixed bottom and selectively removable closure top portion.

U.S. Pat. No. 5,850,706 illustrates a scope cover for an optical scope. The cover is cylindrical and made of stretchable material with an access slit opening on the side which will yield to allow insertion and removal of a lens therewithin.

U.S. Patent Publication 2016/0229729 discloses and claims a tubular clam shell like configured case for a wet paint roller illustrating a fixed hard-shell enclosure with removable threaded end plug and a hinge split body member for positioning the paint roller within for cleaning.

SUMMARY OF THE INVENTION

A tubular transport and equipment platform for optical image capture and related lens equipment providing a portable mounting and stabilization system that will enable multiple user configurations as required. An integral adjustable mounting rail system enables the pre-mounting of equipment so as to be ready and available upon rapid deployment in a single self-contained integral application suitable for field deployment in a variety of environmental venues.

DESCRIPTION OF THE DRAWINGS

FIG. 3 is a side elevational view thereof in closed transport configuration with resilient end caps in place.

FIG. 4 is a side elevational view with the end caps removed, ready for deployment on a support tripod shown in broken lines.

FIG. 5 is a side elevational view of the transport case in open used position.

FIG. 6 is a top plan view thereof.

DETAILED DESCRIPTION OF THE INVENTION

Figure 1:
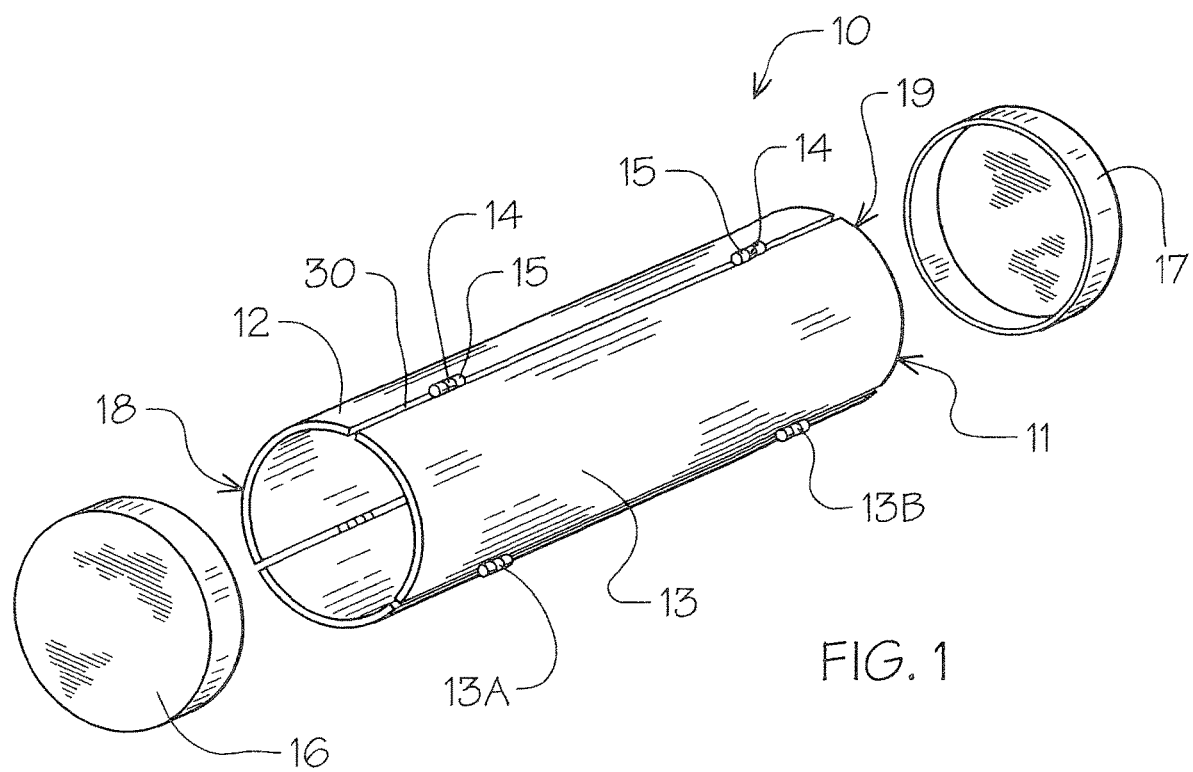
FIG. 1 is an exploded perspective view of the optics transport deployment case of the invention.

Referring to FIGS. 1, 3, 4, 6 and 10 of the drawings, a portable optics and equipment transport case 10 can be seen adapted for attachment to an equipment tripod stand T shown in broken lines by a mounting plate 10A so as to be self-supporting when deployed.

The optical equipment case 10 has a cylindrical main body member 11 with a pair of oppositely disposed hinged sidewalls 12 and 13. Each of the cylindrical sidewalls 12 and 13 are pivotally hinged to the main body member 11 at 12A and 12B and 13A and 13B respectively in equal spaced positional orientation to one another as best seen in FIG. 6 of the drawings. The cylindrical sidewalls 12 and 13 will thereby registerably be engaged in longitudinal free edge to edge relation to define the cylinder body member 10 with the interengaging alignment closures 14 and 15 as will be well known by those skilled in the art.

Figure 9:
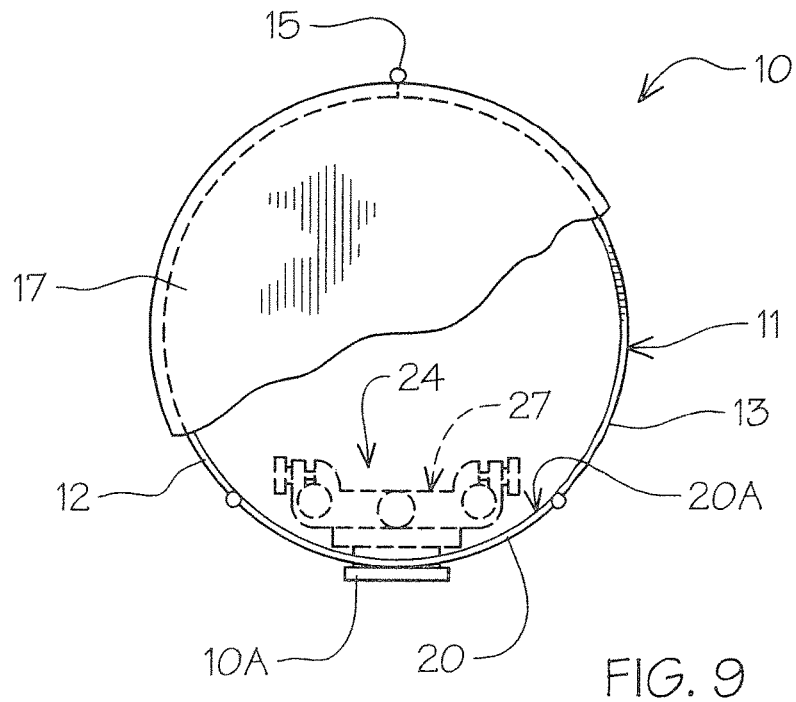
FIG. 9 is an enlarged partial end elevational view of the transport cylinder.
Figure 10:
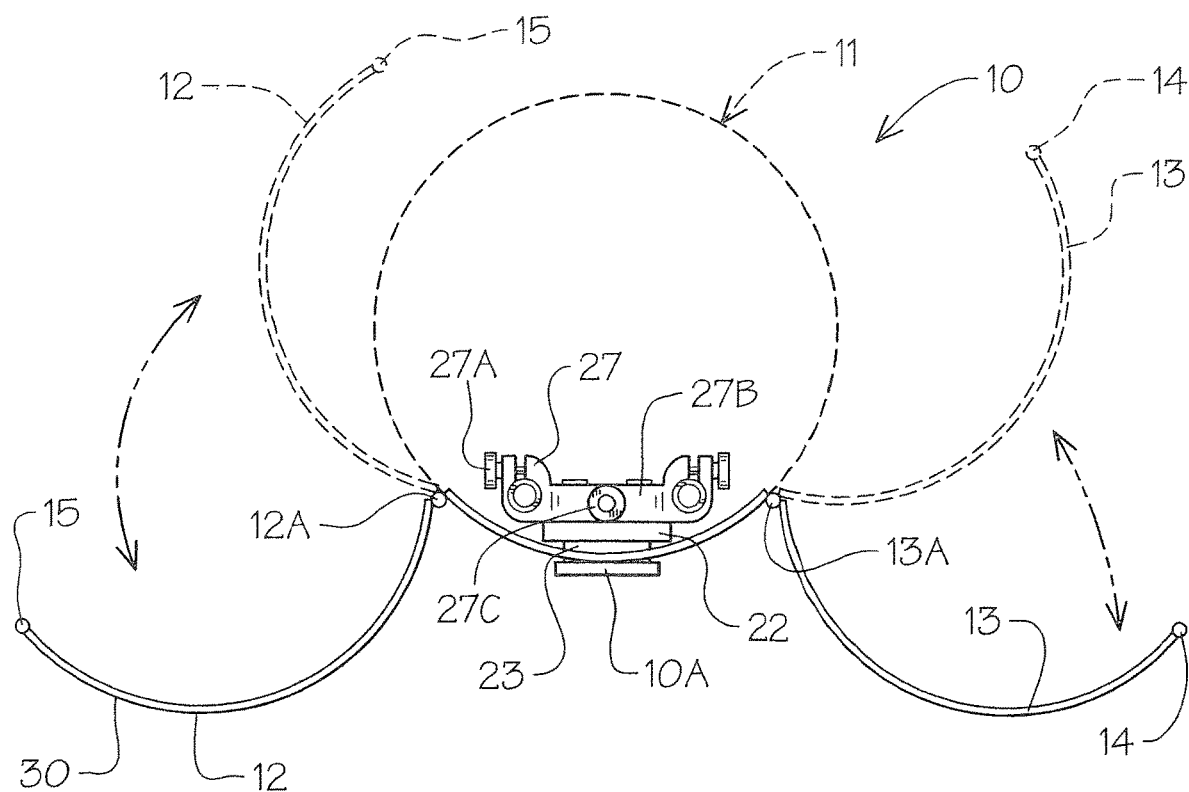
FIG. 10 is an enlarged end elevational view showing deployment of the transport case.

For secure transport, a pair of oppositely disposed enlarged end caps 16 and 17 are frictionally secured on the open ends 18 and 19 of the closed cylinder body member 10 as best seen in FIGS. 1, 3 and 9 of the drawings.

An equipment mounting surface is formed within a cylinder base portion 20 of the cylinder body member 11 from which the respective cylinder sidewalls 12 and 13 are hinged as hereinbefore described.

Figure 11:
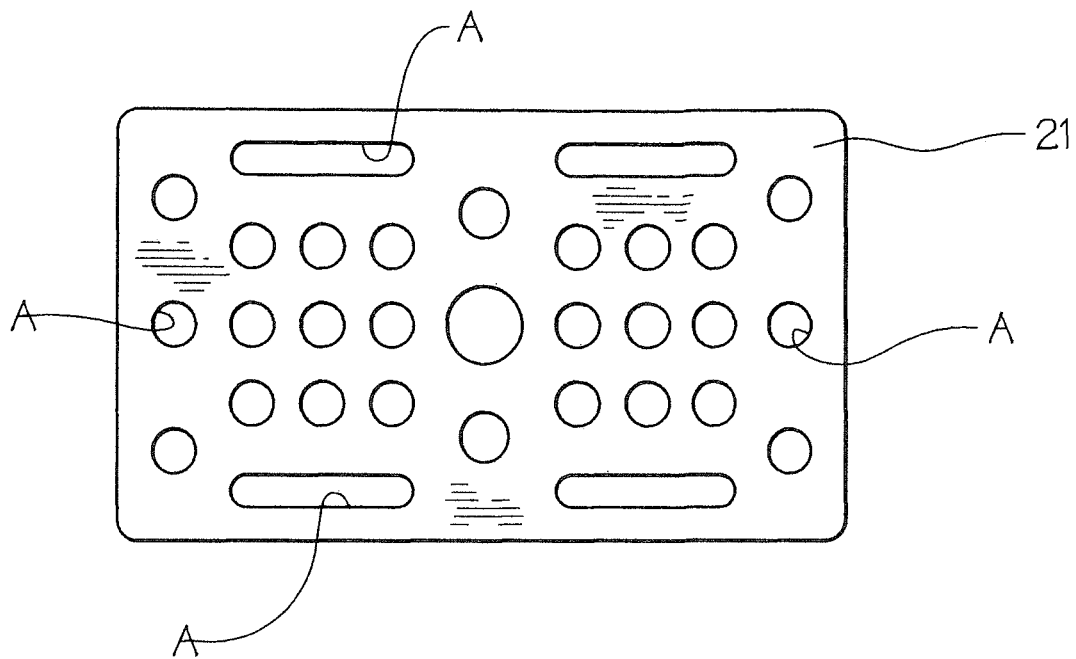
FIG. 11 is an enlarged top plan view of an interior mounting platform of the rail assembly.
Figure 12:
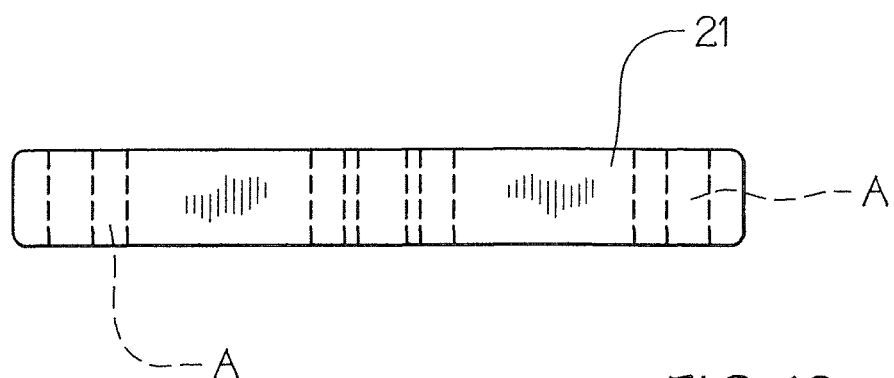
FIG. 12 is a side elevational view thereof.

The base portion 20 has by definition an arcuate inner surface 20A on which is selectively secured universal apertured equipment mounting platforms 21 and 22 in longitudinal spaced relation to one another as best seen in FIGS. 6 and 11 of the drawings.

The mounting platforms 21 and 22 are positioned on a contoured base 23 so as to conform to the arcuate inner based surface 20A of the base portion 20 and may be of alternate configurations depending on application.

The apertured mounting platforms 21 and 22 have a plurality of slots from threaded apertures A therein and in this application provides for a variety of possible mounting orientations to a rail system 24, best seen in FIGS. 2, 6, 7 and 11 of the drawings.

Referring now to the equipment and mounting adjustable rail system assembly 24 it can be seen having a pair of tubular rails 25 slidably secured and held by a rail fitting 26.

Figure 8:
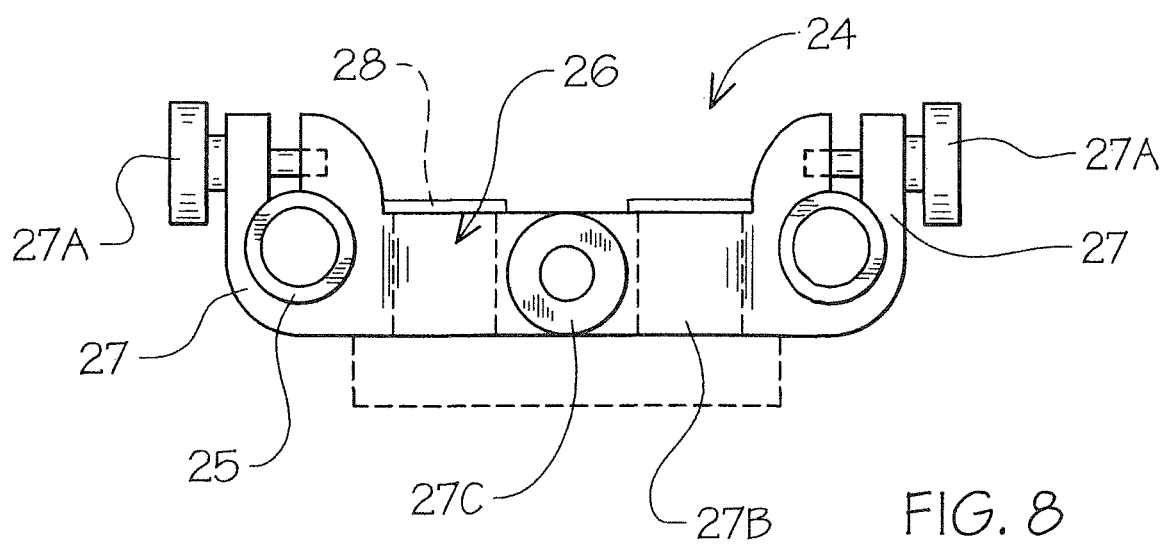
FIG. 8 is an enlarged end elevational view on lines 8-8 of FIG. 7.

A rail fitting 26 has a pair of compression rail assemblies 27 with correspondingly threaded adjustment knobs 27A to adjustably secure the respective rails 25 there within. The compression rail assemblies 27 have a central compression bracket mount 27B with a threaded knob 27C for engaging over a pair of upstanding apertured mounting lugs 28 which are secured correspondingly and extend from the mounting platform 21 to provide an integrated connection therewith as seen best in FIGS. 7 and 8 of the drawings. This orientation provides the primary support for the rails 25 within the base portion 20 of the cylinder 11. An equipment mount rail engagement fitting 29 is adjustably secured to the tubular rails 25 in spaced relation to the primary mounting platform 21 as best seen in FIG. 6 of the drawings. The equipment mounting rail engagement fitting 29 provides for a multiple additive equipment mounting support thereto which may be required in certain applications set forth in the example, as illustrated.

Figure 2:
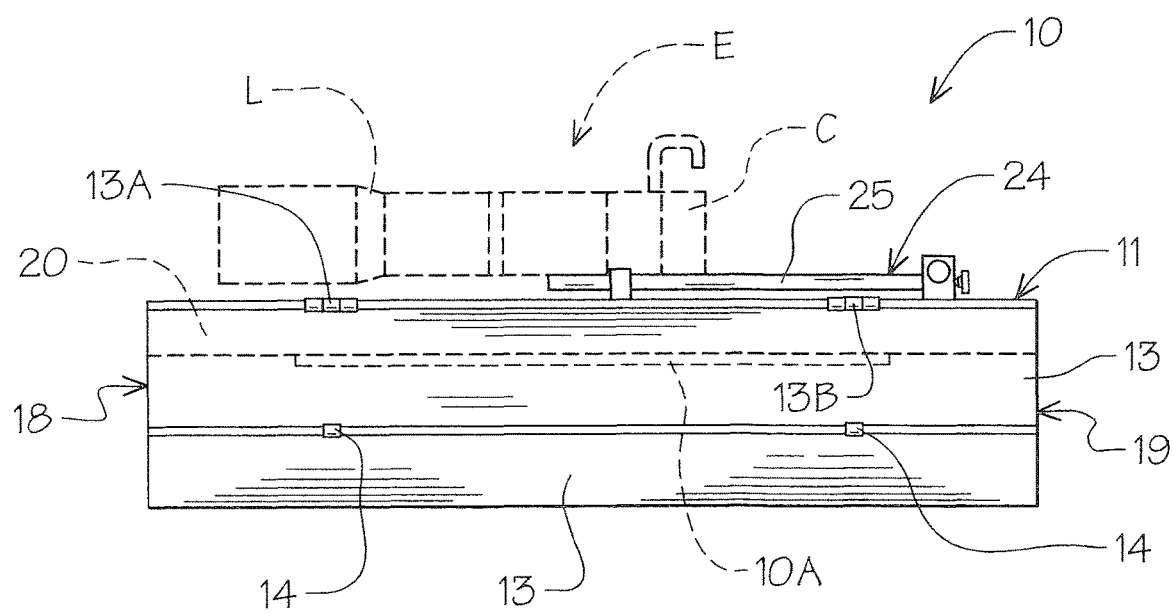
FIG. 2 is a side elevational view of the optics transport deployment case open with mounted equipment shown in broken lines.
Figure 7:
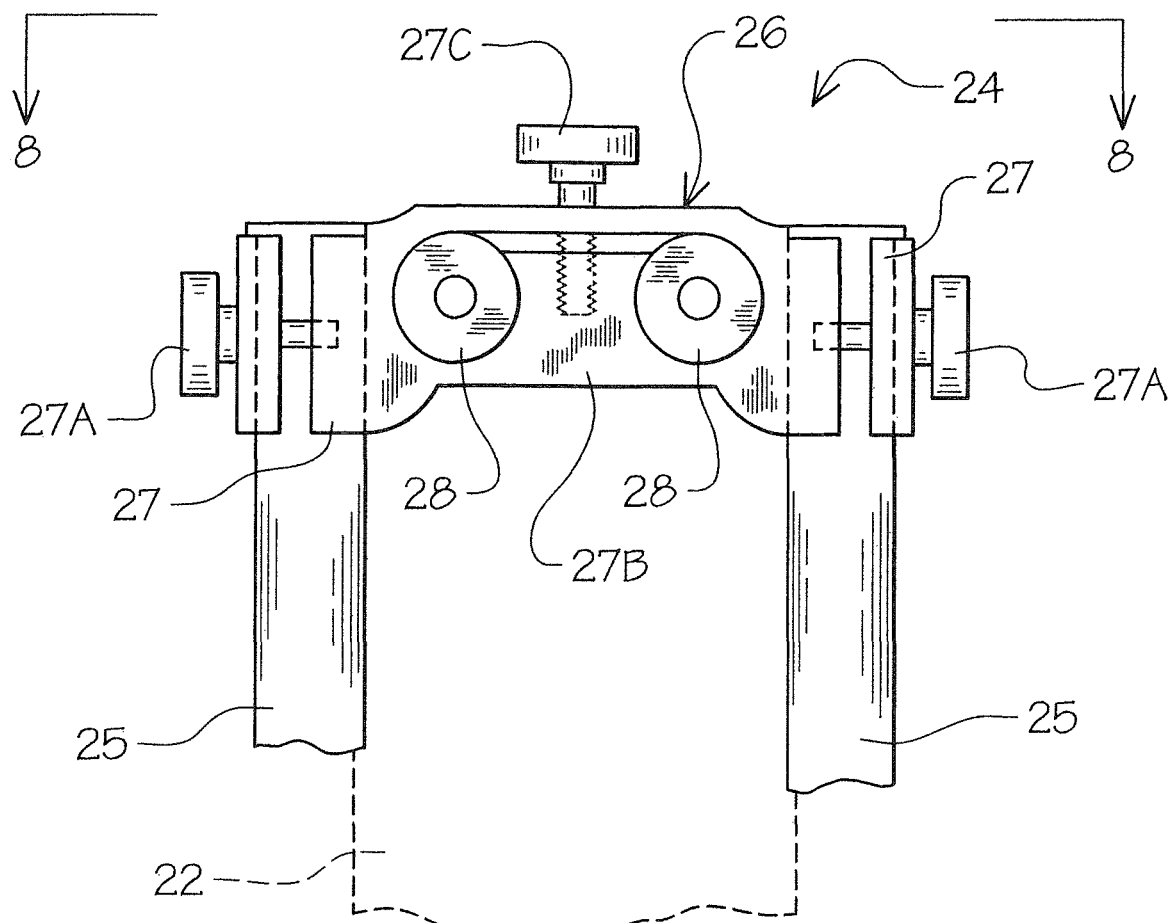
FIG. 7 is an enlarged partial top plan view of the equipment rail mount with rails attached.

In use, the equipment E illustrated, for example, in broken lines in FIG. 2 of the drawings is an optical camera C with an attached performance lens L as is well known within the art. The cameral C and lens L are adjustably mounted within the support case 10 of the invention on the adjustable rail mounting system assembly 24 secured thereto by the hereinbefore described fixed mounting platform 21. It will be evident that the pre-assembly of the camera C and lens L for operational use secured within the equipment and support transport case 10 of the invention will thereby allow for rapid deployment and use in a single self-contained unit.

The respective hinged cylindrical sides 12 and 13 and corresponding attached base portion 20 perimeter edges all have a protective edge lip 30 of resilient material to provide a uniform edge closure surface there between when enclosed transport mode as seen in FIGS. 3 and 4 of the drawings.

It will also be seen that an engagement strap, not shown, can be selectively secured to the outer surface of the portable optical equipment and support case 10 for ease of user transport, as required.

It will therefore be seen that the portable optical equipment and support case 10 provides integrated elongated optical support platform made in this application of carbon fiber and used for the transportation and protection of expensive camera equipment and lens. The system is especially useful to military applications such as both ground and airborne infiltration operations which require a self-contained durable equipment transport and holder with ease of deployment in a variety of adverse conditions which may be encountered.

It will therefore be seen that a new and useful portable optical equipment and support case of the invention has been illustrated and described and it will be apparent to those skilled in the art that various changes and modifications may be made therein without departing from the spirit of the invention. Therefore I claim:

The invention claimed is:

1. A portable optics equipment transport and mounting case comprising,
   a cylindrical body member comprising, a pair of oppositely disposed cylindrical hinged sidewalls, a mounting base formed between said cylindrical sidewalls, a pair of equipment mounting platforms secured to said mounting base,
   a rail system secured to one of said mounting platforms.

2. The portable optics equipment transport and mounting case set forth in claim 1 wherein said rail system comprises,
   a pair of spaced parallel rails, a compression bracket mounting secured on said rails to one of said mounting platforms.

3. The portable optics equipment transport and mounting case set forth in claim 2 wherein said rail system further comprises,
   an equipment mounting rail engagement fitting secured to said rails in spaced relation to one of said mounting platforms.

4. The portable optics equipment transport and mounting case set forth in claim 3 wherein said equipment mounting rail engagement fitting is slidably disposed on said spaced parallel rails.

5. The portable optics equipment transport and mounting case set forth in claim 1 wherein said equipment mounting platforms are in spaced longitudinal aligned relation to one another.

6. The portable optics equipment transport and mounting case set forth in claim 1 wherein said cylindrical body member has a pair of end closure caps selectively secured thereon.

7. The portable optics equipment transport and mounting case set forth in claim 1 wherein said respective equipment mounting platforms have a plurality of slots and threaded apertures therein for securing optical equipment thereto.

8. The portable optics equipment transport and mounting case set forth in claim 1 wherein said mounting base is concave having a pair of longitudinally spaced hinges on its respective spaced parallel edges registerable with said respective cylindrical hinged sidewalls.

9. The portable optics equipment transport and mounting case set forth in claim 1 wherein said cylindrical hinged sidewalls have interengaging aligning enclosure elements for selective engagement to one another defining a cylinder enclosure with said mounting base of said cylindrical body member.

10. The portable optics equipment transport and mounting case set forth in claim 1 wherein said cylindrical body member further comprises,
    a tripod mount on said mounting base.

* * * * *